United States Patent Office 3,076,014
Patented Jan. 29, 1963

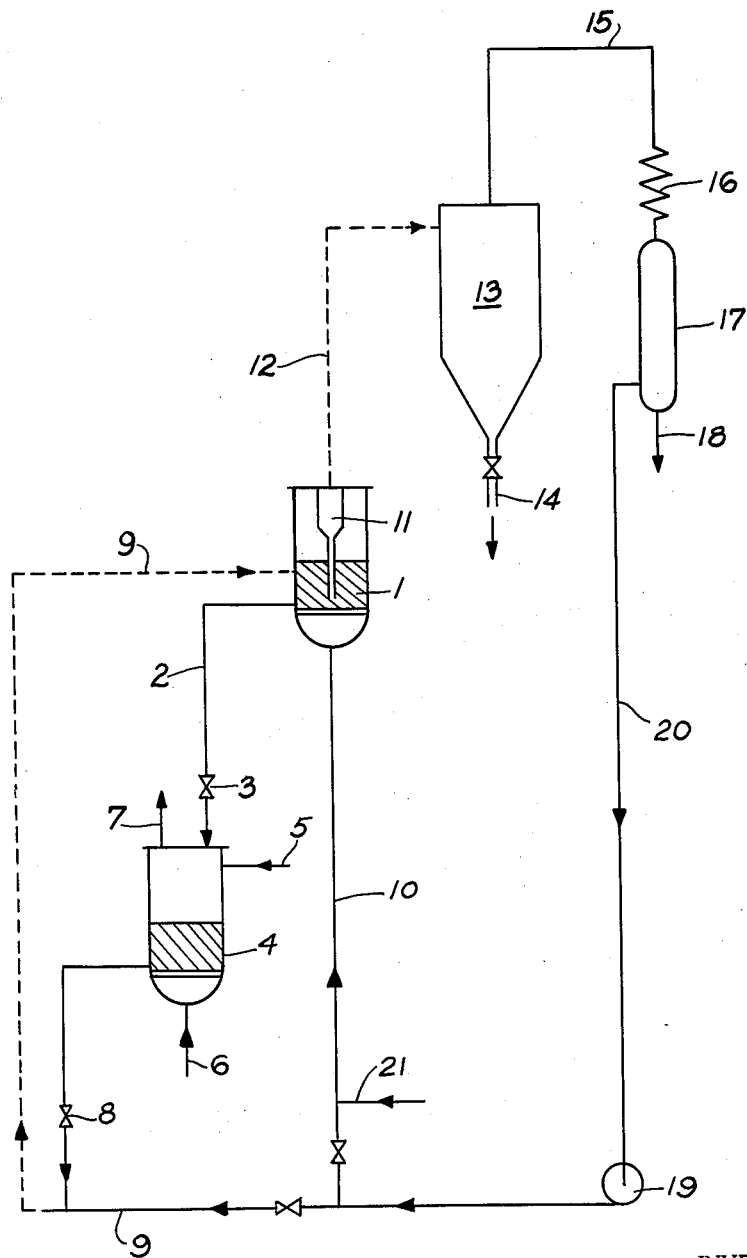

3,076,014
CONTINUOUS PRODUCTION OF
PHTHALODINITRILES
Hugo Kroeper, Heidelberg, Werner Fuchs, Ludwigshafen (Rhine), and Rolf Platz, Mannheim, Germany, assignors to Badische Anilin- & Soda-Fabrik Aktiengesellschaft, Ludwigshafen (Rhine), Germany
Filed May 1, 1958, Ser. No. 732,351
Claims priority, application Germany May 9, 1957
4 Claims. (Cl. 260—465)

This invention relates to a process for the continuous production of aromatic nitriles. More specifically the invention relates to a process for the production of phthalodinitriles by reacting a phthalic acid and ammonia in a fluidized layer.

It is already known to convert aromatic dicarboxylic acids with ammonia into aromatic dinitriles in the presence of aluminium oxide or other dehydrating catalysts. Working has hitherto been both with rigidly arranged catalysts and with moving catalysts. Many solid aromatic dicarboxylic acids, which are readily decomposable or difficult to vaporize, can only with difficulty be introduced into the reaction chamber and moved therein by reason of their physical properties. This is true above all for the important phthalic acids. Since various derivatives of the phthalic acids, for example the ammonium salts, monoamides, diamides or esters, have physical properties which permit an easier and more convenient handling, the phthalic acids, to facilitate the carrying out of the reaction, have hitherto been converted into these derivatives and then reacted according to the known methods. Thus for example the U.S. patent specification No. 2,773,891 describes a process for the production of iso- and tere-phthalodinitriles by reaction of ammonium salts, monoamides or diamides of iso- and tere-phthalic acids with ammonia in the presence of dehydration catalysts in the rigid bed or fluidized bed methods. If however the free acids are used instead of the said derivatives—which would be simpler—there occur in the supply of the initial material, both during carrying out of the process in a rigid bed and in a fluidized bed, difficulties by caking of the initial material when it meets the ammonia by which the acids are conveyed into the reaction vessel. When the conveyance is effected by a stream of ammonia, the tubular conduits become stopped up after a short time. If the initial materials are introduced by endless screws, these become oiled and clogged. These difficulties are to be obviated in the known methods by avoiding completely any reaction between ammonia and the phthalic acids in the supply pipes by conveying the initial materials into the catalyst chamber by means of inert gas. This solution of the problem has the disadvantage however that the concentration of the ammonia in the reaction zone is diminished in an undesirable way by the inert gas.

We have now found that in the continuous production of phthalodinitriles by direct reaction of a phthalic acid with ammonia in the presence of a dehydration catalyst, the difficulty conveyable initial material can be conveyed in a simple way and reacted, by first fluidizing the solid phthalic acid in a preliminary mixing vessel with a catalyst having a grain size of 0.1 to 1.0 mm. by means of an inert gas current and then conveying the resultant fluidizable mixture by means of a stream of ammonia into a reaction zone in which it is reacted at 250° to 500° C. in a fluidized layer.

It is surprising that the fluidizable mixture obtained from the catalyst and the initial material by fluidization with inert gases no longer exhibits, upon meeting ammonia, the undesirable phenomena, such as caking in the pipes. On the contrary this fluidizable mixture can be conveyed without trouble by means of ammonia into the actual reaction zone in which it can be reacted in the fluidized layer with the ammonia in the presence of the catalyst simultaneously introduced to form phthalodinitriles in the best yields.

The initial materials are the isomeric phthalic acids, especially isophthalic and terephthalic acids. It is an advantage of the process that it is not necessary to convert the phthalic acids into derivatives before the actual reaction with ammonia.

The catalysts used are dehydrating substances which have good flow properties, as for example aluminium oxide, boron phosphate, aluminium phosphate, silica gel, molybdic acid, titanium dioxides or mixtures of these substances, for example a silica gel impregnated with phosphoric acid. Since the process is carried out in a fluidized layer, the grain size of the catalyst is of importance. In general, catalysts of the above mentioned kind are suitable for carrying out the process when they are present in grain sizes of 0.1 to 1 mm. Catalysts are preferred which have grain sizes of from 0.1 to 0.3 mm. It is preferable to add to the catalyst only such an amount of the substance to be reacted that the flow properties of the catalyst are maintained. Expressed in terms of weights, mixtures are used in which the initial material and the catalyst are present in the ratio of 1:20 to 1:3, especially 1:10 to 1:4. This mixture is fluidized by an inert gas stream in a preliminary vessel. As the inert gas there may be used for example air or nitrogen or any other gas which does not react with the initial materials and the reaction products. The mixing vessel may be kept at temperatures which lie between room temperature and the melting point of the initial material, especially at 50° to 150° C. The fluidization in the mixing vessel is usually carried out at normal pressure or at increased pressure, preferably at normal pressure or moderately increased pressure, as for example at 1 to 2 atmospheres. The fluidizable and flowable mixture obtained is then conveyed by a stream of ammonia into the actual reaction zone in such a way that the amount of catalyst in the reaction zone remains constant. In the reaction zone itself, in which the initial material is treated with ammonia in a fluidized layer, a temperature of 250° to 500° C. should prevail. It is advantageous to work at 360° to 430° C. Ammonia may also be additionally introduced directly into the fluidized layer. The mol ratio of initial material to ammonia during the reaction in the fluidized layer may amount for example to 1:3 to 1:20, preferably 1:6 to 1:10.

When carrying out the process continuously it is preferable to keep a certain amount of the catalyst in circulation by withdrawing a part continuously from the reaction chamber and returning it in any suitable way into the mixing vessel. The substance to be reacted is added and mixed therewith by fluidization with an inert gas stream. It is preferable also to maintain a circulation for the unreacted ammonia. The end products are obtained for example by cooling from the gases leaving the reaction chamber.

The accompanying diagrammatic drawing is a flow sheet of an arrangement for carrying out the process by way of example.

Referring to the drawing, a certain amount of catalyst is continuously withdrawn from a fluidized layer reactor 1 through a pipe 2 and a valve 3 into a mixing vessel 4. The temperature in the mixing vessel 4 should lie below the melting temperature of the initial material. If necessary therefore the catalyst may be led through a cooler (not shown) in the path of the pipe 2 before introduction into the mixing vessel, and the resultant heat recovered if desired in a suitable heat-exchanger (not shown), for example for heating the ammonia supplied through pipe 10. The initial material is brought by a conveyor device 5 into the mixing vessel 4 in which it is mixed with the introduced catalyst by fluidization by an auxiliary gas current introduced through a pipe 6. The auxiliary gas current leaves the mixing vessel through a pipe 7. The mixing in the mixing vessel 4 can be facilitated by mechanical means provided additionally (not shown). The flowable, fluidizable mixture of catalyst and phthalic acid is withdrawn through a valve 8 and carried by a current of ammonia led through a pipe 9 into the reaction vessel 1. Additional ammonia may be supplied to the reaction vessel 1 through the pipe 10. The reaction mixture leaves the reaction vessel 1 in gaseous and vaporous phase through a cyclone 11 in which entrained catalyst is separated again, and passes through a pipe 12 into a separator 13 which is adjusted to a temperature which is above the dewpoint of the water formed but below the melting point of the dinitrile formed. The dinitrile is separated and withdrawn through a pipe 14 and the valve situated therein. The gaseous and vaporous fractions are led through a pipe 15 into a cooler 16 and separator 17 in which the byproducts together with the condensed water are separated and removed through a pipe 18. The excess of ammonia which remains gaseous is withdrawn from the separator 17 by a blower 19 and returned in circulation through the pipe 20. Such an amount of fresh ammonia is added through a pipe 21 as is used up in the reaction.

It is obviously also possible to work in an arrangement which differs from that described above in that the mixing vessel is arranged above the reaction vessel. The use of such an arrangement has the advantage that the conveyance of the flowable mixture of catalyst and phthalic acid from the mixing vessel 4 into the reaction vessel 1 requires an extremely small amount of ammonia. The conveyance of the catalyst withdrawn from the reaction vessel 1 to the mixing vessel 4 can in this case be carried out by an auxiliary gas, for example air or nitrogen.

The following examples will further illustrate this invention but the invention is not restricted to these examples. The parts specified are parts by weight.

*Example 1*

From a reaction vessel which is kept at 410° to 430° C. and which contains 200 parts of aluminium oxide having a granulation of less than 0.3 mm. there are removed per hour 1,000 parts of catalyst through a regulating valve and conveyed by a current of gas into a mixing vessel. The mixing vessel contains 100 parts of catalyst. 150 parts of terephthalic acid per hour are added to the mixing vessel and mixed with the catalyst by blowing a current of air of a speed of 20 centimeters per second through the bottom of the mixing vessel which is formed as a sieve plate. The mixture falls through a down pipe provided with a regulating valve into a current of ammonia which blows 1,150 parts per hour of the mixture into the reaction vessel tangentially closely above the bottom of the same, while a current of ammonia, at least of equal strength, is blown into the reaction vessel from the bottom and keeps the contents of the reaction vessel in fluidized motion. 250 parts of ammonia in all are blown in per hour. 108 parts per hour of terephthalodinitrile are obtained.

*Example 2*

From a reaction vessel which is kept at 370° to 400° C. and which contains 200 parts of aluminium oxide with a granulation of less than 0.3 mm., there are withdrawn each hour 800 parts of catalyst through a regulating valve and conveyed into a mixing vessel. The mixing vessel contains 100 parts of catalyst. 200 parts per hour of isophthalic acid are added to the mixing vessel and mixed with the catalyst by means of a current of nitrogen. 1,000 parts of the mixture are withdrawn per hour through a regulating valve and conveyed by a current of ammonia into the reaction vessel. The gas leaving the reaction vessel is cooled to a temperature below 160° C. but not below the dewpoint. 147 parts of isophthalodinitrile thereby separate out and after the final drying it has a purity of 99.6%.

We claim:
1. In a process for the continuous production of a phthalodinitrile, the steps which comprise maintaining a fluidized mixture by fluidizing in a fluidizing zone a solid phthalic acid selected from the group consisting of isophthalic acid and terephthalic acid at a temperature lying between room temperature and the melting point of said solid phthalic acid by means of a current of inert gas selected from the group consisting of air and nitrogen with grains of solid dehydration catalyst of a grain size of 0.1 to 1.0 mm. in the ratio by weight of said phthalic acid to catalyst of 1:20 to 1:3, and conveying the resultant fluidized mixture of the solid phthalic acid and the solid dehydration catalyst by means of a current of ammonia directly from said fluidizing zone into a reaction zone separate from said fluidizing zone in which said phthalic acid is reacted with ammonia at a temperature of from 250° to 500° C. in a fluidized layer of said solid catalyst grains to produce the corresponding phthalodinitrile selected from the group consisting of isophthalodinitrile and terephthalodinitrile.

2. A process as claimed in claim 1 wherein the dehydration catalyst is aluminum oxide.

3. In a process for the continuous production of a phthalodinitrile, the steps which comprise maintaining a fluidized mixture by fluidizing in a fluidizing zone a solid phthalic acid selected from the group consisting of isophthalic acid and terephthalic acid by means of a current of inert gas selected from the group consisting of air and nitrogen with grains of solid dehydration catalyst of a grain size of 0.1 to 0.3 mm. in the ratio by weight of 1:10 to 1:4 and at a temperature in the range of 50–150° C., adding the resultant fluidized mixture of the solid phthalic acid and the solid dehydration catalyst to a current of ammonia, and conveying the ammonia current directly from said fluidizing zone into a reaction zone separate from said fluidizing zone in which said phthalic acid is reacted with ammonia at a temperature of from 360° to 430° C. in a fluidized layer of said catalyst grains to produce the corresponding phthalodinitrile selected from the group consisting of isophthalodinitrile and terephthalodinitrile.

4. A process as claimed in claim 3 wherein the molar ratio of said phthalic acid to ammonia while reacting in the fluidized layer is 1:3 to 1:20.

References Cited in the file of this patent

UNITED STATES PATENTS

| | | |
|---|---|---|
| 2,054,088 | Linstead et al. | Sept. 15, 1936 |
| 2,232,836 | Bowlus | Feb. 25, 1941 |
| 2,678,941 | Ferstandig | May 18, 1954 |
| 2,773,891 | Toland et al. | Dec. 11, 1956 |
| 2,857,416 | Ferstandig et al. | Oct. 21, 1958 |
| 2,901,504 | Aries | Aug. 25, 1959 |